(12) United States Patent
Lin

(10) Patent No.: US 7,380,026 B2
(45) Date of Patent: May 27, 2008

(54) COMPUTER SYSTEM WITH NETWORK SIGNAL LEVEL INDICATION DEVICE

(75) Inventor: Yung-Chang Lin, Yonghe (TW)

(73) Assignee: Mitac Technology Corp., Hsin-Chu Hsien (TW)

( * ) Notice: Subject to any disclaimer, the term of this patent is extended or adjusted under 35 U.S.C. 154(b) by 273 days.

(21) Appl. No.: 11/257,028

(22) Filed: Oct. 25, 2005

(65) Prior Publication Data

US 2007/0038742 A1    Feb. 15, 2007

(30) Foreign Application Priority Data

Jul. 26, 2005    (TW) .............................. 94125323 A

(51) Int. Cl.
*G06F 3/00* (2006.01)
*G06F 13/00* (2006.01)

(52) U.S. Cl. ........................ 710/15; 709/250

(58) Field of Classification Search ............ 710/15–19; 345/156–173; 455/226.2; 709/250
See application file for complete search history.

(56) References Cited

U.S. PATENT DOCUMENTS

| | | | | |
|---|---|---|---|---|
| 6,064,372 A | * | 5/2000 | Kahkoska | 345/173 |
| 7,092,688 B2 | * | 8/2006 | Lee et al. | 455/226.2 |
| 7,190,121 B2 | * | 3/2007 | Rose et al. | 315/129 |
| 2004/0224685 A1 | * | 11/2004 | Hertzberg et al. | 455/434 |
| 2004/0224701 A1 | * | 11/2004 | Lewis-Evans et al. | 455/456.2 |
| 2005/0159125 A1 | * | 7/2005 | Lodolo et al. | 455/226.4 |
| 2006/0094364 A1 | * | 5/2006 | Hirota et al. | 455/66.1 |
| 2006/0194545 A1 | * | 8/2006 | Morisawa | 455/67.13 |

FOREIGN PATENT DOCUMENTS

TW      565063      12/2003

\* cited by examiner

*Primary Examiner*—Christopher Shin
(74) *Attorney, Agent, or Firm*—Rosenberg, Kleni & Lee

(57) ABSTRACT

A computer system with a device for indicating the network signal level of the LAN connected to the computer system is provided. The network signal level indication device includes a network signal level detection unit for detecting the signal level of the LAN connected to the computer and generating a set of network state signals, an indication unit interface circuit for receiving the set of network state signals generated by the network signal level detection unit, and a network signal level indication unit for receiving the set of network state signals and generating a light signal indicating the network signal level. The network signal level detection unit is the keyboard controller of the computer system.

6 Claims, 4 Drawing Sheets

COMPUTER SYSTEM WITH NETWORK SIGNAL LEVEL INDICATION DEVICE

FIELD OF THE INVENTION

The present invention relates to a device for indicating the network signal level and, more particularly, to a computer system with a device for indicating the network signal level of a local area network connected to the computer system.

BACKGROUND OF THE INVENTION

In the conventional LAN (Local Area Networking) technology, signal cables and connectors are used for network connection and resources sharing. The broadband network technology inherits the same connection structure. Because this structure sometimes brings about a number of routing problems in various places, such as offices, business setup, hotels, and public places, wireless networks are developed to replace the conventional wired networks.

A typical wireless network bridge comprises a network port, which is connected to a connector receptacle of a wired LAN through a cable having an RJ-45 connector. The transmission and reception of wireless signals of the wireless network bridge is through a wireless signal transceiver and an antenna. In the IEEE specifications for wireless network communication, a computer having a wireless network card can exchange the signal with the wireless network bridge through wireless signals.

SUMMARY OF THE INVENTION

In the network environment, regardless of wired or wireless, the signal level of the network can only be known through network applications. A user cannot keep track of the network signal level. This is especially critical when the network signal level is so low as to interfere with the network communication function, and yet the user is unable to determine whether the problem is a result of network communication or the application. This problem is more severe in the wireless network environment.

Therefore, it is important to device a mechanism that indicates the network signal level in the wireless network environment so that the user can keep track of the network usage condition.

A primary objective of the present invention is to provide a network signal level device applicable to a computer system. By detecting the signal level of the LAN connected to the computer system, the device generates a set of network state signals indicated by a set of optical indicators.

Another objective of the present invention is to provide a simple network signal level indication device, which employs a simple circuit design and a network application of a computer system to achieve the detection and indication of the network signal level.

To realize the above objectives, the present invention provides a device for indicating a network signal level in a computer system. The network signal level indication device comprises a network signal level detection unit for detecting the signal level of a LAN connected to the computer system and generating a set of network state signals, an indication unit interface circuit for receiving the set of network state signals generated by the network signal level detection unit, and a network signal level indication unit for receiving the set of network state signals and generating a light signal indicating the network signal level.

In a preferred embodiment, the network signal level detection unit comprises a keyboard controller of the computer system. The network signal level indication unit comprises a plurality of light-emitting diodes (LEDs) connected through control lines to the indication unit interface circuit, respectively. The LEDs are for indicating the network signal level. The network signal level indication unit can also be a multi-color LED for indicating different signal levels with different colors.

In comparison with the conventional technologies, the present invention overcomes the drawback where a user cannot keep track of the network signal level during the network access and communication. By using the network signal level indication device of the present invention, a computer can inform the user of the network signal level. In addition, the present invention employs a simple circuit design in conjunction with the network application of a computer to achieve the detection and indication of the network signal level. The realization of the present invention is both easy and inexpensive.

These and other objects, features, and advantages of the invention will be apparent to those skilled in the art, from a reading of the following brief description of the drawings, the detailed description of the preferred embodiment, and the appended claims.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
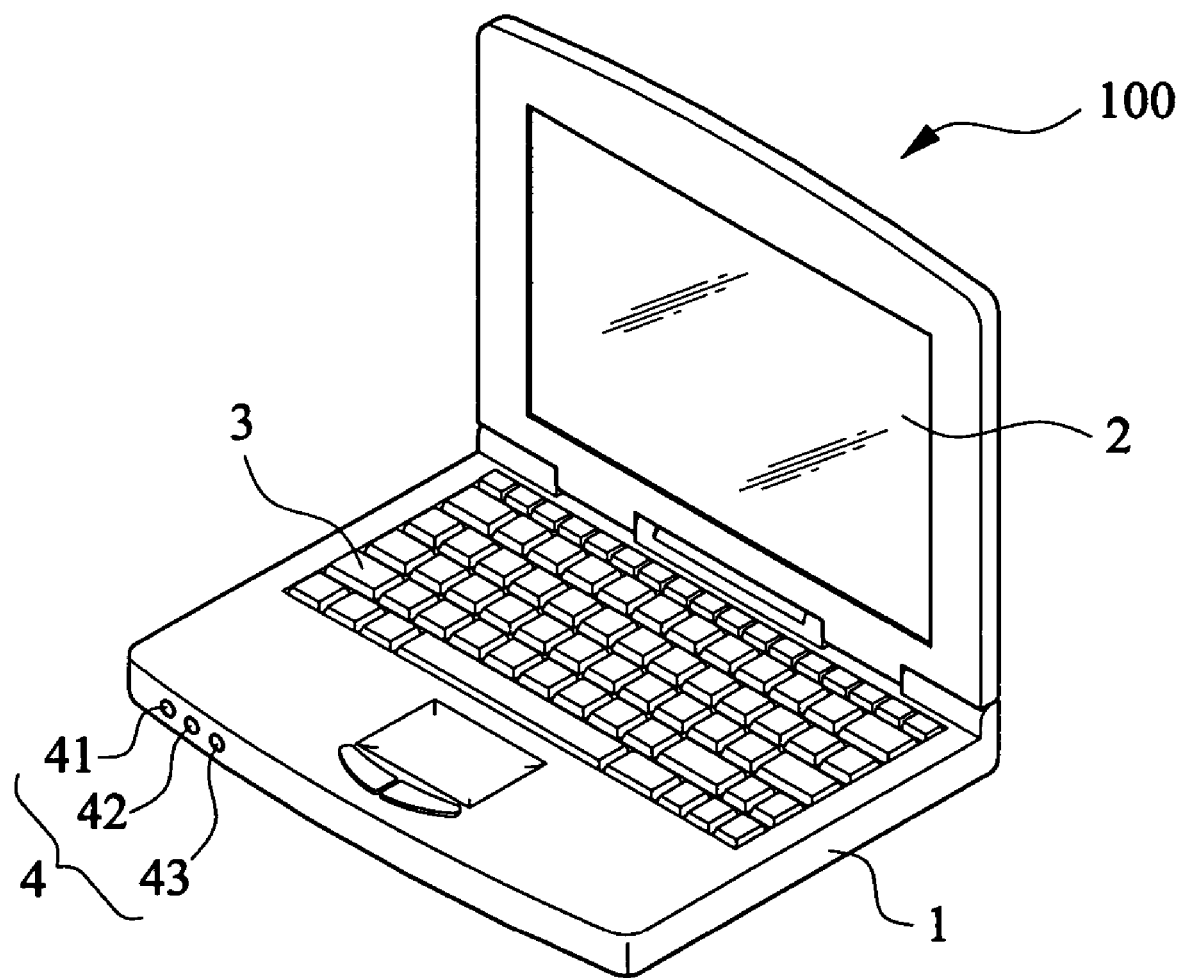
FIG. 1 is a configuration view of a notebook computer with a network signal level indication device of the present invention.

With reference to the drawings and in particular to FIG. 1, which shows a configuration view of a notebook computer with a network signal level indication device of the present invention, the computer, which is generally designated with reference numeral 100, comprises a host computer case 1, a display 2, and a keyboard 3. The host computer case 1 comprises a network signal level indication unit 4 arranged at a suitable location for indicating signal level of a wireless network of computer 100.

The network signal level indication unit 4 comprises a plurality of light emitting diodes (LEDs) 41, 42, 43. The LEDs 41, 42, 43 can have different colors, for example, red, green and blue. The LEDs 41, 42, 43 can be placed at a front side of the host computer case 1, or other suitable locations. The LEDs 41, 42, 43 can also be disposed at locations close to the display 2. In addition to adding the LEDs 41, 42, 43 to the design of the computer 100, the LEDs available in the original design of the computer 100 can also be used as LEDs 41, 42, 43 for indicating the network signal level by modifying the related control programs.

Figure 2:
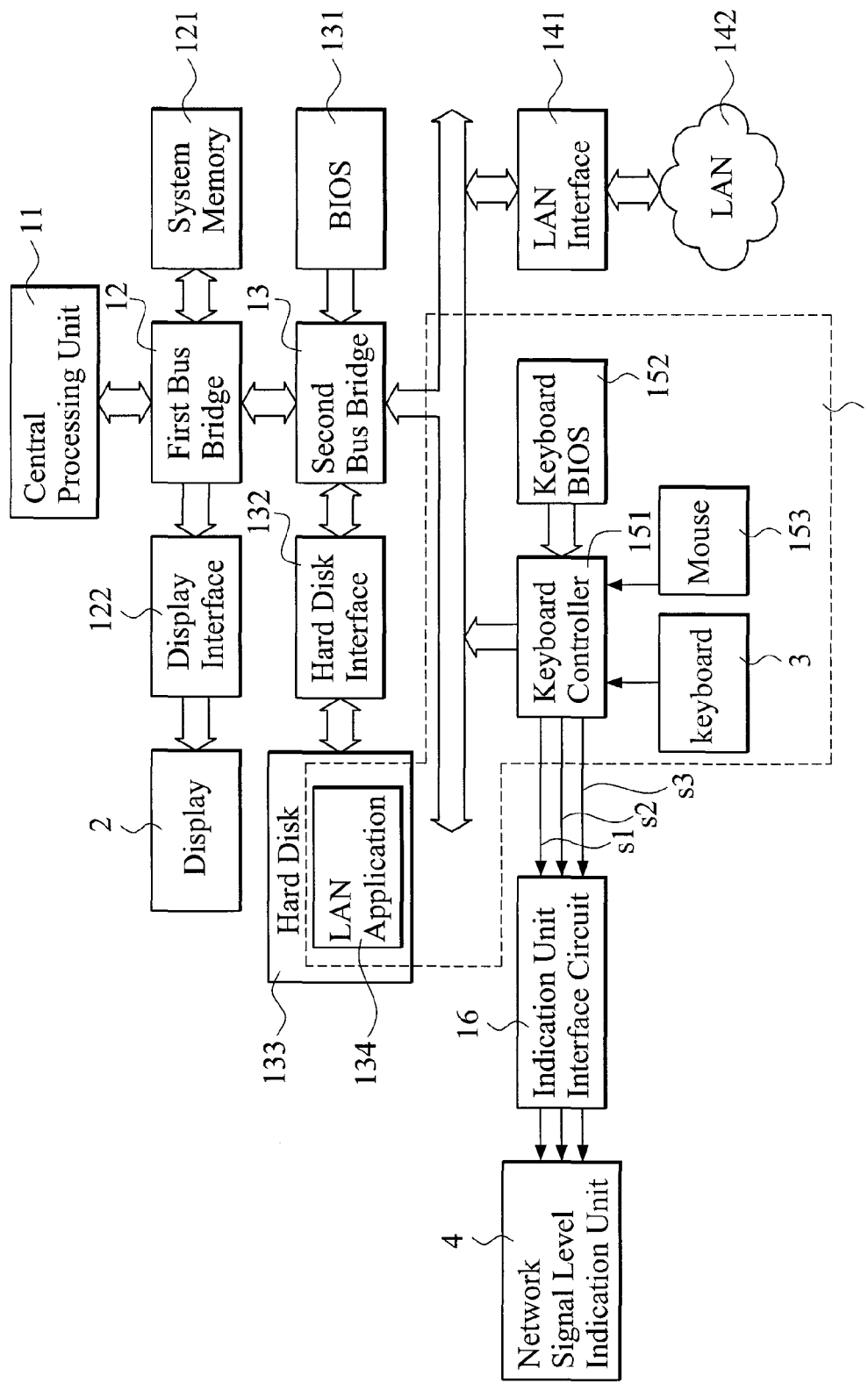
FIG. 2 is a functional block diagram of a notebook computer with a network signal level indication device of the present invention.

Also referring to FIG. 2, which shows a functional block diagram of a notebook computer with a network signal level indication device of the present invention, the computer 100 comprises a central processing unit (CPU) 11, a first bus bridge 12, and a second bus bridge 13. The CPU 11 is connected to the first bus bridge 12 through s system bus. The first bus bridge 12 is connected to a system memory 121. The first bus bridge 12 is also connected to the display 2 through a display interface 122.

The second bus bridge 13 is connected to a basic input/out system (BIOS) 131. The BIOS 131 stores a BIOS program and a power-on-self-test (POST) program required by the computer during the booting process.

The second bus bridge 13 is connected to a hard disk interface 132 through a bus. The hard disk interface 132 is further connected to a hard disk 133 for data storage of the computer 100. In addition to the operating system (OS), drivers and applications for all the device peripherals, the hard disk 133 also stores a local area network (LAN) application 134.

The second bus bridge 13 is also connected to a LAN interface 141 through a bus. The LAN interface 141 is further connected to a LAN 142. The computer can form a local area network or a computer network with other or remote computers. The LAN 142 can be a wireless LAN (WLAN).

A network signal level detection unit 15 is connected to the second bus bridge 13 through a bus. In the preferred embodiment, the network signal level detection unit 15 can be a keyboard controller 151 of the computer 100. The keyboard controller 151 is connected to a keyboard BIOS 152, a mouse 153, and a keyboard 3. The network signal level detection unit 15 is for detecting the signal level of LAN 142 connected to the computer 100 and generating a set of network state signals s1, s2, s3.

An indication unit interface circuit 16 is connected to the network signal level detection unit 15 for receiving the network state signals s1, s2, s3 sent by the keyboard controller 151 of the network signal level detection unit 15. A network signal level indication unit 4 is connected to the indication unit interface circuit 16 to receive the network state signals passing through the indication unit interface circuit 16 and to generate a control signal to represent the signal level to network signal level indication unit 4. The LEDs 41, 42, 43 of the network signal level indication unit 4 will be on or off to indicate the network signal level.

Figure 3:
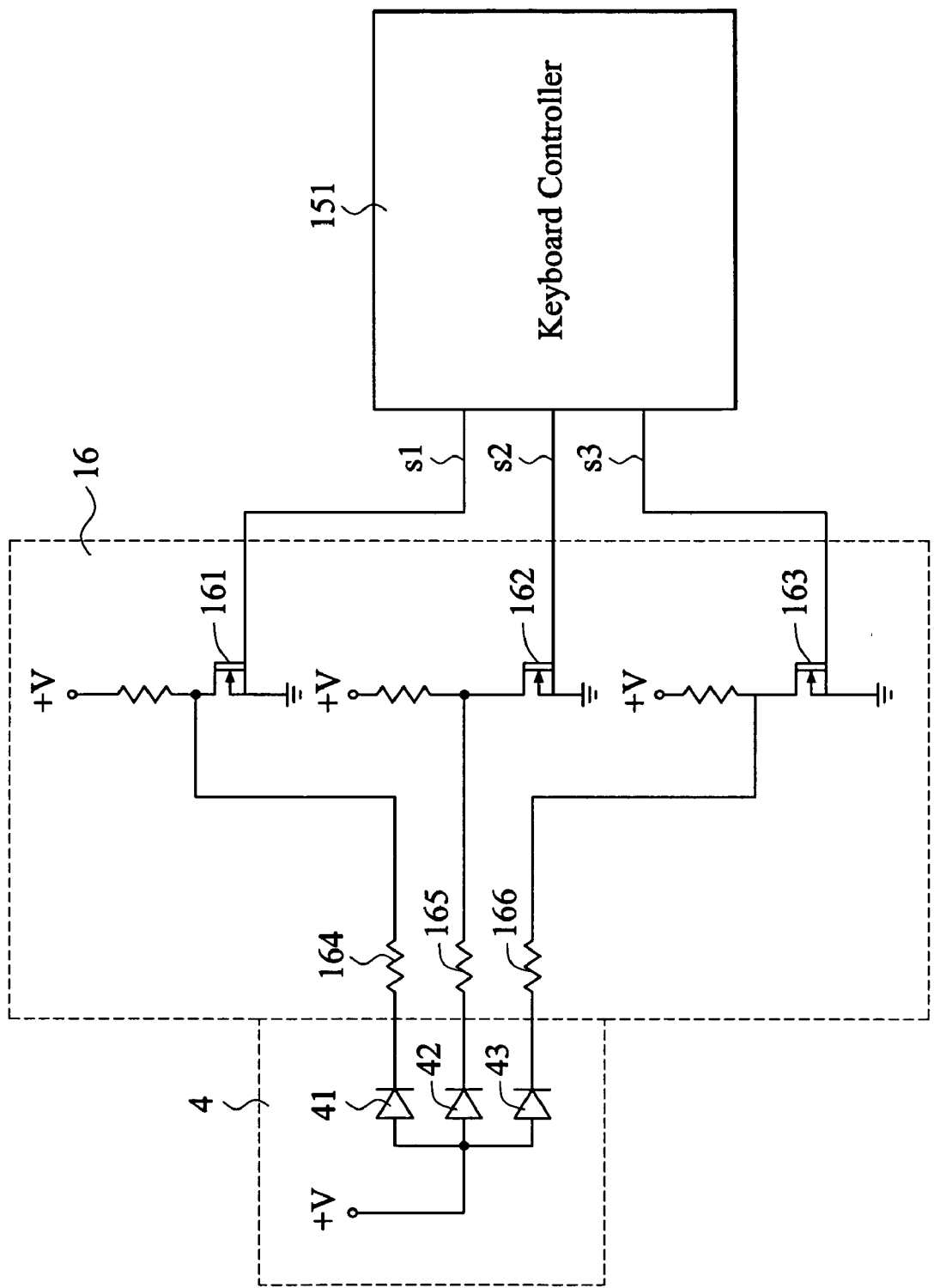
FIG. 3 is a first embodiment of control circuit of network signal level detection unit, indication unit interface circuit and network signal level indication unit of FIG. 2.

Also referring to FIG. 3, which shows an embodiment of a control circuit of the network signal level detection unit 15, the indication unit interface circuit 16, and the network signal level indication unit 4, the network state signals s1, s2, s3 generated by the keyboard controller 151 can control, through driving elements 161, 162, 163 and current-limiting resistors 164, 165, 166, the on/off state of the LEDs 41, 42, 43 of the network signal level indication unit 4 to indicate the network signal level.

During the actual detection operation, the computer 100 obtains the network signal level of the LAN 142 through the LAN application 143 after the computer 100 executes a LAN application 134 in the hard disk 133. The computer 100 informs the keyboard controller 151 of the signal level and the keyboard controller 151 generates, according to the signal level, the network state signals s1, s2, s3 to control the on/off state of the LEDs 41, 42, 43 of the network signal level indication unit 4 to indicate the network signal level.

For example, the LEDs 41, 42, 43 of the network signal level indication unit 4 are red LED, green LED, and blue LED, respectively. When the network signal level is 100%, the LED 41 will be on. When the network signal level is 50%, the LED 42 will be on. In this way, different color LEDs indicate different signal levels.

Figure 4:
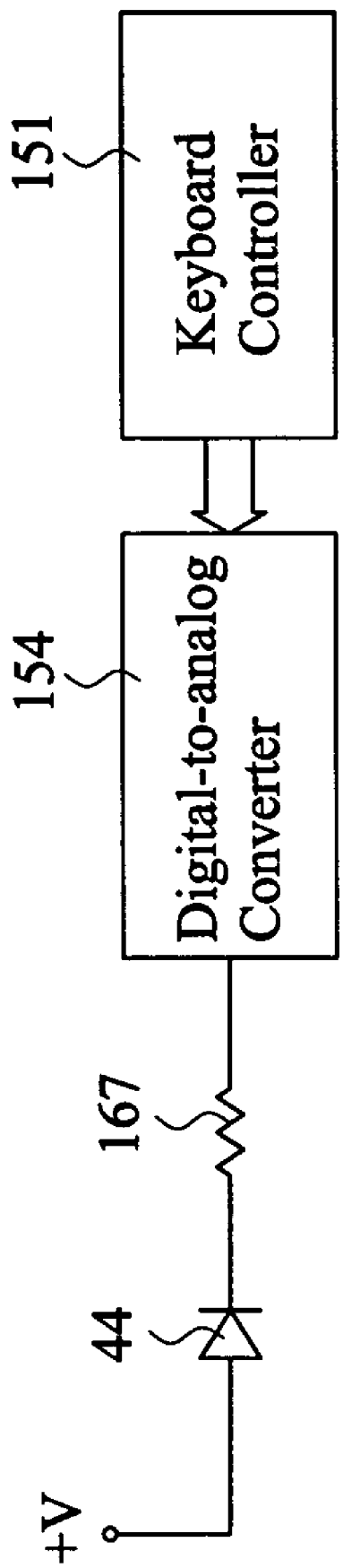
FIG. 4 is a second embodiment of control circuit of network signal level detection unit, indication unit interface circuit and network signal level indication unit of FIG. 2.

Also referring to FIG. 4, which shows another embodiment of a control circuit of the network signal level detection unit 15, the indication unit interface circuit 16, and the network signal level indication unit 4, this embodiment is similar to the first embodiment discussed previously, except that network signal level indication unit 4 comprises only a multi-color LED 44. The multi-color LED 44 is connected to the keyboard controller 151 through a current-limiting resistor 167 and a digital-to-analog converter 154. The keyboard controller 151 generates, according to the received signal level, a control signal to control, through the digital-to-analog converter 154, the color of the LED 44 of the network signal level indication unit 4 to indicate the network signal level.

While the invention has been described in connection with what are presently considered to the most practical and preferred embodiments, it is to be understood that the invention is not to be limited to the disclosed embodiments, but on the contrary, is intended to cover various modifications and equivalent arrangement included within the spirit and scope of the appended claims.

What is claimed is:

1. A computer system with a network signal level indication device for indicating network signal level of a local area network (LAN) connected to the computer system, the network signal level indication device comprising:
    means for detecting the signal level of the LAN connected to the computer system and generating a set of network state signals by a keyboard controller connected to the computer system;
    an indication unit interface circuit, connected to the network signal level detection means for receiving the network state signals generated by the network signal level detection means; and
    a network signal level indication unit, connected to the indication unit interface circuit for receiving the network state signals through the indication unit interface circuit to generate an indication signal to indicate the network signal level.

2. The computer system as claimed in claim 1, wherein the network signal level indication unit comprises a plurality of light-emitting diodes (LED) connected respectively to the indication unit interface circuit for indicating the network signal level using on/off state.

3. The computer system as claimed in claim 2, wherein the LEDs are connected respectively through corresponding driving elements of the indication unit interface circuit to the network signal level detection means.

4. The computer system as claimed in claim 1, wherein the network signal level indication unit comprises a multi-color light-emitting diode (LED) for indicating the network signal level by using different colors.

5. The computer system as claimed in claim 4, wherein the multi-color LED is connected to the network signal level detection means through a digital-to-analog converter.

6. The computer system as claimed in claim 1, wherein the network signal level indication unit is arranged at a pre-determined location of a case of the computer system.

* * * * *